US008027880B2

(12) United States Patent
Darveau-Garneau

(10) Patent No.: US 8,027,880 B2
(45) Date of Patent: Sep. 27, 2011

(54) ACQUISITION OPTION IN AUCTION CONFIGURATION

(75) Inventor: Nicolas Darveau-Garneau, San Francisco, CA (US)

(73) Assignee: Bidcactus, LLC., Westport, CT (US)

( * ) Notice: Subject to any disclaimer, the term of this patent is extended or adjusted under 35 U.S.C. 154(b) by 0 days.

(21) Appl. No.: 12/817,047

(22) Filed: Jun. 16, 2010

(65) Prior Publication Data

US 2010/0332306 A1 Dec. 30, 2010

Related U.S. Application Data

(60) Provisional application No. 61/220,516, filed on Jun. 25, 2009.

(51) Int. Cl.
*G06Q 30/00* (2006.01)

(52) U.S. Cl. .......................................................... 705/26

(58) Field of Classification Search .................... 705/26, 705/27

See application file for complete search history.

(56) References Cited

U.S. PATENT DOCUMENTS

| | | | |
|---|---|---|---|
| 6,012,045 A | 1/2000 | Barzilai et al. | |
| 6,023,685 A | 2/2000 | Brett et al. | |
| 6,366,891 B1 | 4/2002 | Feinberg | |
| 7,152,042 B1 | 12/2006 | Arkes | |
| 7,904,347 B2 | 3/2011 | Hasseler | |
| 2004/0193529 A1 | 9/2004 | Asher et al. | |
| 2006/0274364 A1 | 12/2006 | Hasseler | |
| 2008/0010077 A1 | 1/2008 | Hasseler | |
| 2008/0195412 A1* | 8/2008 | Gologorsky et al. | 705/1 |
| 2010/0318416 A1* | 12/2010 | Seymour et al. | 705/14.23 |

OTHER PUBLICATIONS

U.S. Office Action mailed Apr. 13, 2010 for U.S. Appl. No. 11/768,364, filed Jun. 26, 2007, 43 pages.

* cited by examiner

*Primary Examiner* — Mila Airapetian
(74) *Attorney, Agent, or Firm* — Fenwick & West LLP

(57) ABSTRACT

A configuration is configured to allow purchase of an item available in an auction. The configuration transmits to a bidder a plurality of bids for use in an auction. Each bid is given a predetermined bid value. The configuration provides for display a selectable interface to place a bid on the item and a selectable interface to purchase the item at the retail price. The configuration receives from the bidder at least one bid on the item. In response to each bid received from the bidder for the item, the configuration reduces the retail price for the item by a value corresponding to the bid value. The configuration then provides for display the reduced retail price in response to each bid received from the bidder for on the item. The bidder can continue with the auction in an attempt to receive the auctioned item at a low cost or may purchase the auction item at a retail price minus the total of the value of bids placed by that bidder.

20 Claims, 6 Drawing Sheets

ACQUISITION OPTION IN AUCTION CONFIGURATION

CROSS REFERENCE TO RELATED APPLICATIONS

This application claims the benefit of U.S. Provisional Application No. 61/220,516, filed Jun. 25, 2009, which is incorporated by reference in its entirety.

BACKGROUND

1. Field of Art

The disclosure generally relates to the field of electronic commerce.

2. Description of the Related Art

Auctions conducted online are well known. Generally auctions are conducted so that participant bidders bid on an item and the highest bidder wins. A twist on an auction is an entertainment auction, which sometimes is referred to as a penny auction. In a penny auction, participant bidders must buy a bundle of bids and use one every time they raise their virtual paddle. In some configurations, bids cost 60 cents to $1 each and are bought in packs of 10 to 700, depending on the site.

Although winners of penny auctions receive a substantial discount on an auctioned item, such discounts can be wiped away depending on the number of bids placed prior to winning the item. Moreover, when the bidding closes other bidders who have not won the auction are left with nothing despite incurring a cost for participating in the auction.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed configuration (system, method and computer readable storage medium) that includes providing a configuration to purchase an item available that is available in an auction. The configuration transmits to a bidder a plurality of bids for use in an auction. Each bid is given a predetermined bid value. The configuration receives log in credentials from the bidder. Upon receipt of this information the configuration provides for display an item available for auction and a retail price for the item. The configuration also provides for display a selectable interface to place a bid on the item and a selectable interface to purchase the item at the retail price. The configuration receives from the bidder at least one bid on the item. In response to each bid received from the bidder for the item, the configuration reduces the retail price for the item by a value corresponding to the bid value. The configuration then provides for display the reduced retail price in response to each bid received from the bidder for on the item. The bidder may now continue with the auction in an attempt to receive the auctioned item at a low cost or may purchase the auction item at a retail price minus the total of the value of bids placed by that specific bidder.

As disclosed herein, it is noted that although reference is made to an item in the auction process throughout the specification, such item need not be limited to a tangible good. For example, the item can be a service or can be a combination of a good and service.

Computing Machine Architecture

Figure 1:
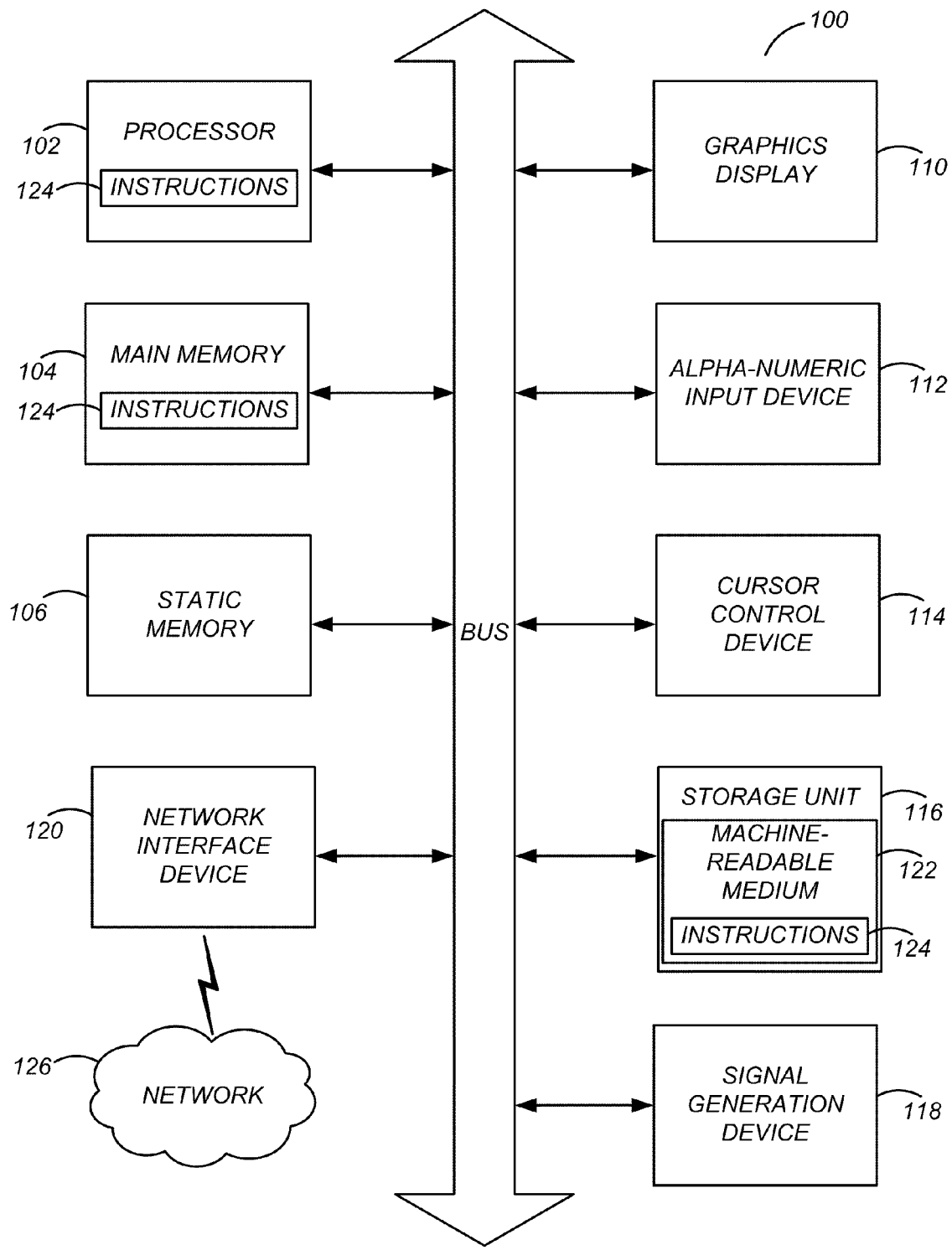
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein. In the disclosed configurations the instructions 124 comprise the processes (or modules) of an auction system and disclosed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

Figure 2:
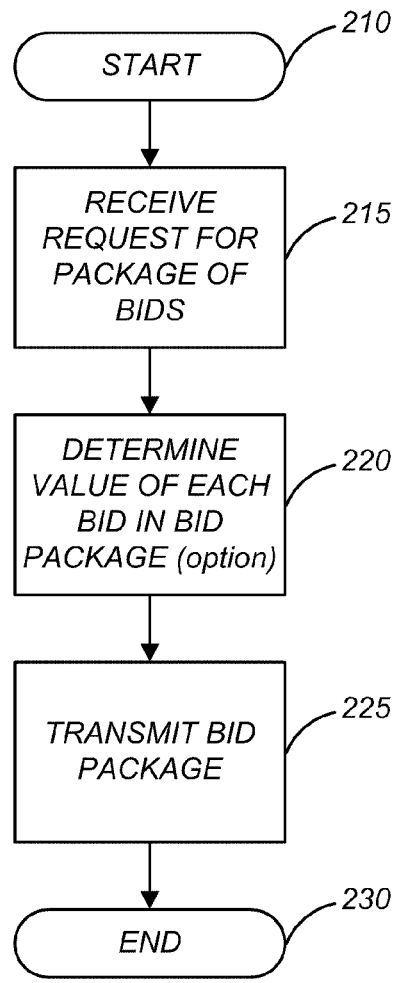
FIG. 2 illustrates one embodiment of a process for transmitting a package of bids in response to a request for a package of bids.
Figure 3:
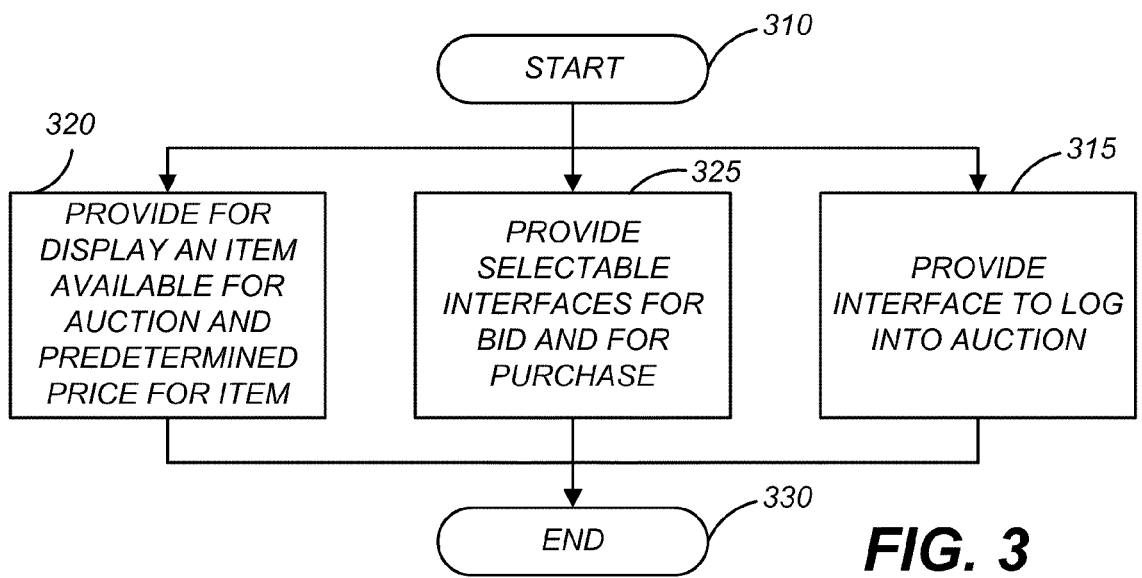
FIG. 3 illustrates one embodiment of a process for providing for display bid and retail purchase information for at least one item to a potential bidder.
Figure 4:
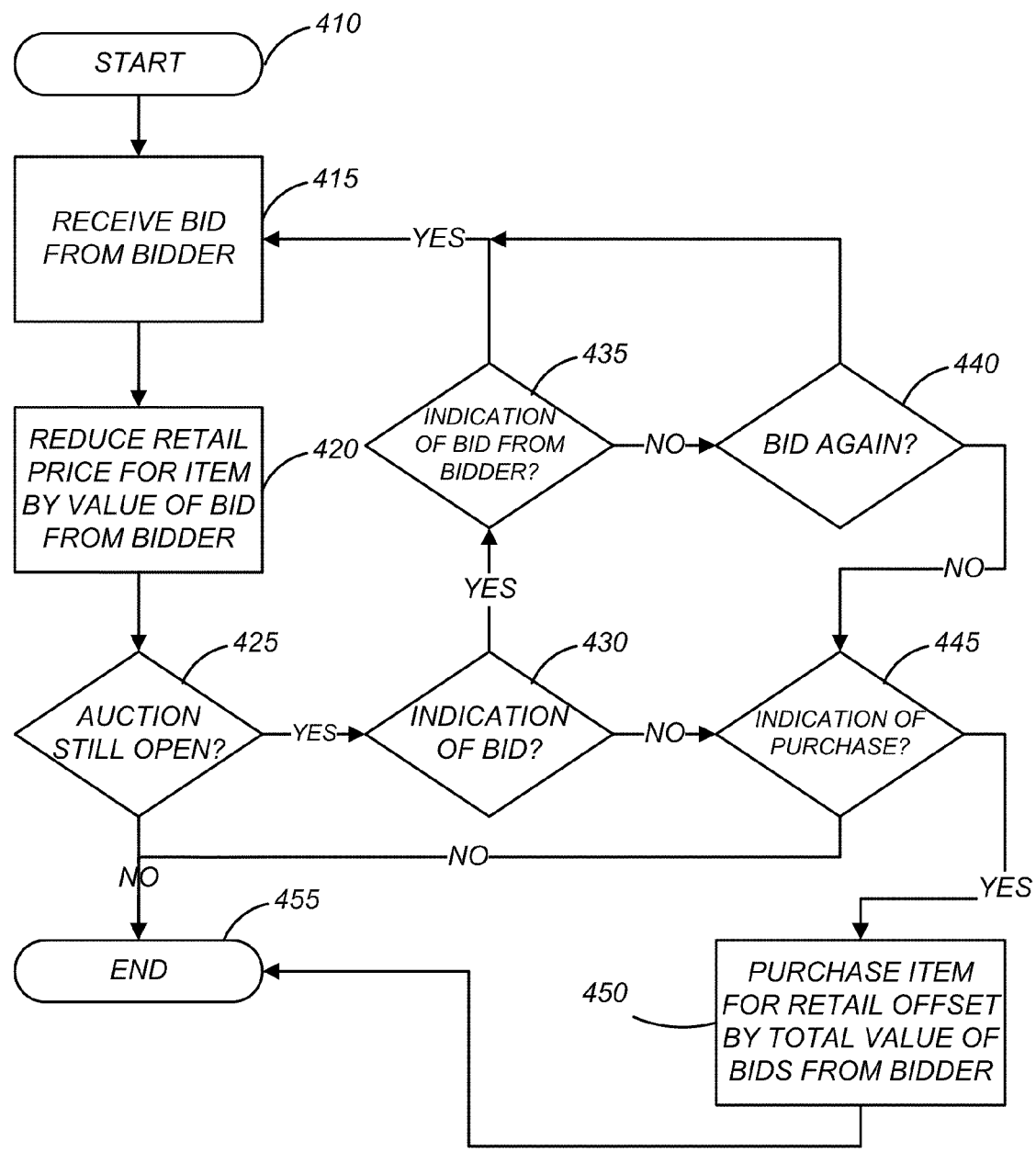
FIG. 4 illustrates one embodiment of a process for bidding or purchase an item being auctioned.

The storage unit 116 includes a machine-readable medium (or machine-readable storage medium) 122 on which is stored instructions 124 (e.g., software) embodying any one or more of the methodologies or functions described herein, for example, with respect to the processes in FIGS. 2-4 or the example in FIGS. 5-9. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media that is configured to store instructions (e.g., instructions 124). Moreover, it includes not only the physical media, but also the corresponding software and other functional components within it, e.g., a centralized or distributed database, or associated caches and servers. The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Architecture for Auction System

FIGS. 2 through 4 provide one example of an architecture of an auction system. The auction system is described through a central entity that manages the auction process. In one embodiment, the descriptions of the processes of the auction system herein are configured as modules storable and executable within a computer system, for example, the computer system 100. The modules may include instructions 124 that are stored within the storage unit 116, for example, in a machine readable medium 122. The instructions 124 are executable through a processor 102.

Referring now to FIG. 2, it illustrates one embodiment of a process for transmitting a package of bids in response to a request for a package of bids. In one embodiment, the process starts 210 with the auction system receiving 215 a request for a package of bids (or bid package). The request may be for a particular bid package. The bid package corresponds to a predetermined number of bids that are bundled and sold at a predetermined price. In addition, in alternate embodiments bid packages within the auction system can be configured so that bid values for each bid in a package can differ. In such instances, the auction system determines 220 the value of each bid in the bid package, e.g., to determine which auctions such bids in the bid package can be applied. Examples of this configuration include having different levels of auctions where in some cases bids sold at a higher cost per bid can be used for higher priced auctions while bids sold at a lower cost per bid can be used for lower priced auctions. The bid package is ultimately transmitted 225 to the requester for subsequent use in an auction process as disclosed herein before this part of the process ends 230.

Turning next to FIG. 3, it illustrates one embodiment of a process for providing for display bid and retail purchase information for at least one item to a potential bidder. For ease of discussion the process will be described in the context of a bidder in general. It is noted that the bidder may begin as a potential bidder and then become an actual bidder once the user begins bidding on items.

In terms of beginning the bidding process, as previously described the bidder must first obtain a bid package that includes one or more bids for use in the bidding process. Typically, this is done after the bidder has set up an account with the auction system. Hence, before purchasing a bid package or partaking in one or more auctions, the bidder creates an account with the auction system. Creation of an account includes creating (or being assigned) user identification and password, which are used to obtain access into an auction system. In additional, the creation of the account may include providing additional details such as credit card information to complete transactions, e.g., purchase additional bid packages, pay for a won auction, or purchase of an item being auctioned. The creation of an account may also include providing for the auction system other information such as security information, user preferences such as notifications of particular auctioned items or bidding information, and the like. The auction system may store account related information in a database in the storage unit 116 of the computer system 100.

In FIG. 3, the process starts 310 and the bidder (or user) is provided a user interface that includes selectable interfaces to interact with the auction system. For example, the auction system provides for display 315 an interface to log into the auction system. The auction system within the computer system 100 provides computer program code via the network 126 that the bidder computer system receives. The code is then read through a web browser or application (or applet) for display on the user computer system. For the log in, the interface may include two fields, one to enter in a user identification and the other to enter in a password, along with a selectable interface, e.g., a software button, to submit (or enter) the inputted entry to transmit the information to the computer system 100 via the network 126.

The auction system provides for display 320 at least one item available for auction and a predetermined price for purchase of that item. The predetermined price corresponds to a regular, or retail, price for the item if directly purchased using the auction system. Further, the auction system provides for display 320 with each item shown available for auction, selectable interfaces to place a bid on that particular item or purchase the item at the then shown retail price. At this point the process ends 330 in the context of begin ready to accept bids from the bidder.

FIG. 4 illustrates one embodiment of a process for bidding or purchasing an item being auctioned. In general, the process starts 410 and the auction system receives a bid from the bidder 415. The received bid reduces 420 the retail price for the item that has been bid upon by a predetermined offset amount. The reduction is only for the particular bidder and only the particular bidder computer is provided the user interface display with the reduced retail price. The predetermined offset amount can be, for example, a value equivalent to the actual bid value (e.g., for 100 bids bought at $100, each bid has an actual bid value of $1) or a formula amount corresponding to the actual bid value (e.g., the value is ½ of the actual bid value). At the same time, the price of item being auctioned is raised by a predetermined auction increment amount. The predetermined auction increment amount can be, for example, an amount equivalent to the actual bid value, a formula corresponding to the actual bid value, or a preset increment amount (e.g., $0.15 for each bid submitted).

The auction system then determines 425 if the auction is still open (i.e., not closed). If the process is still open the auction system determines 430 whether another bid has been received for the auctioned items. The auction system determines 435 if the bid is from the bidder. If so, the process continues back around with receiving 415 the bid, incrementing the auction amount, and reducing 420 the retail price for the item for this bidder by the predetermined offset amount. If the bid is not from the bidder, the auction system can be configured to determine 440 if the bidder will bid again or if not, determine 445 if the bidder will purchase the auctioned item. Likewise if the auction is determined 425 to still be open and a determination 430 is made of no indication of a bid, the system may also determine 445 if the bidder will purchase the auctioned item.

If the bidder purchases the auctioned item, it may be purchased 450 for a price that is the originally displayed retail value, e.g., the retail price, minus an offset corresponding to the total of the predetermined offset amounts resulting in the final retail price that is specific to the particular bidder. At this point the item would be considered to be bought and conventional transaction and shipping processes may be applied as the process ends 445. The process may also end 445 when the auction is no longer open and there is no indication to purchase. It is noted that the auction system can be configured to provide a predetermined time window in which the bidder may purchase the auctioned item at the reduced retail value (or full value if no bids came from the bidder) shown to the particular bidder. For example, the bidder can purchase the auctioned item for up to 1 hour after the auction closes.

The configuration as described beneficially provides potential bidders an opportunity to purchase an auctioned item at a significantly lower price than full price for an auctioned item. Moreover, the configuration beneficially allows the bidder to take advance of any bids invested in trying to win the auction by providing an offset against a retail value as set by the auction system to purchase the auctioned item at a reduced price. The reduced price advantageously gives the bidder an opportunity to be a participant in an auction, for example, for entertainment purposes, yet also provides the bidder credits to purchase the auctioned item at a fair value with credits from the auction applied so that the user is given an option to buy the item is they do not win the auction.

Example Auction Process

Figure 5:
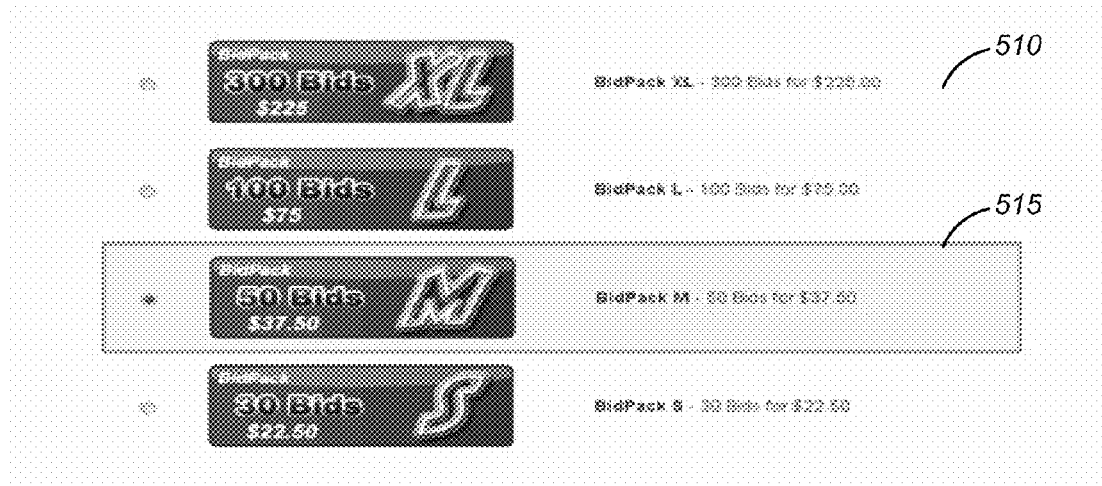
FIG. 5 illustrates one embodiment of a user interface within a computing system for purchase of a pack of bids.

FIGS. 5 through 9 illustrate one example auction process. Turning first to FIG. 5, it illustrates one embodiment of a user interface within a computing system for purchase of a pack of bids. In one example embodiment, users come are drawn to an auction website and either provide a universal resource locator (URL) to the auction system website or through a link, e.g., in an ad on another website, a messaging service, or electronic mail.

FIG. 5 illustrates one embodiment of a user interface 510 displayed within a screen (or display) of a user computing system for purchase of a pack of bids. A bidder (or user), when logged into their account on the website, can acquire bid packs ($0.75 per bid). The bid pack 515 may be acquired through a cash or redeemable credit transaction. Cash transactions include payment services such a PAYPAL and a credit card services. Redeemable credits correspond to redeeming credits associated with the bidder that the bidder can apply to acquire bids. The redeemable credits for use with the auction system website may be obtained by participating in certain offers, receiving a gift of credits, or the like. For example, users can earn 25 bids if they take a 6-day free trial for a service such as NETFLIX or a 3-day free trial for a service such as MATCH.COM. When a bidder pays for a bid or gets redeemable credit for bids, e.g., through an offer, the auction system credits the bidder account with the appropriate number of bids. In one embodiment, a database in the computer system 100 stores the bid count with the user account information.

Figure 6:
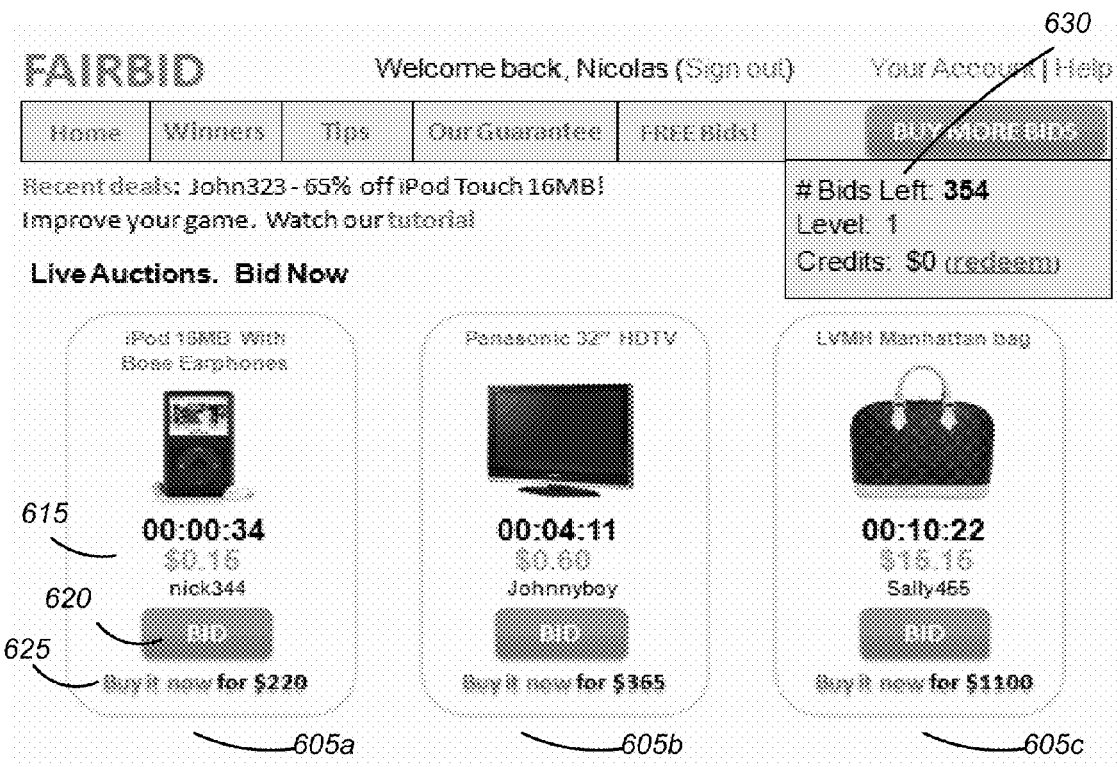
FIG. 6 illustrates one embodiment of a user interface listing auctions for which a logged in bidder may bid and a retail price for each item shown for auction.

FIG. 6 illustrates one embodiment of a user interface 610 listing auctions for which a logged in bidder may bid and a retail price for each item shown for auction. The user interface 610 shows the items that are being auctioned 605a-c, a time and current winning bid value for the auctioned items 615, a BID selectable user interface 620, a BUY IT NOW selectable user interface 625, and a number of BIDS LEFT 630 for the particular user. In this example, the bidder has 354 bids left as shown through the BIDS LEFT 630 information.

When bidding begins, bidders who have bids left in their accounts can participate in a guaranteed auction. Specifically, the auction operates as follows. In one example embodiment, new items are displayed for auction, which in this example are the three items shown (IPOD, PANASONIC HDTV, and LVMH MANHATTAN BAG) 605a-c. When the item is won or bought as disclosed herein it may be shipped directly from wholesalers, although the auction system handles the facilitation of the transaction through the auction or purchase configuration as disclosed. In the example provided, the price of each auction starts at $0.00 and operates within a predetermined time period of 12 hours. Any bidders with bids left can bid on an item.

When a bidder places a bid using the BID selectable interface 620 as displayed on a computer system of that bidder, the bidder uses up one of their bid credits. Specifically, the auction system reduces the bid credits associated with the user account in the database of the computer system 100 by a value of 1. The price of the auction item increases by a pre-determined amount, e.g., $0.15, and is shown 615 on the bidder screen. Note that the predetermined increment is set through the auction system prior to the start of the auction. When the price of the auction item increases, the auction system increases the value of the item in the database by that amount, e.g., identify the auctioned item in the database and increase the auction_id.price_of_item by auction_id.incremental_price_per_bid. The auction clock increases by a pre-determined amount of time, e.g., 20 seconds, and is tracked accordingly in the database, e.g., increase the auction id_time_left_in auction by auction_id.incremental_time_per_auction. The most recent bidder now has the current winning bid in the auction. If nobody bids and the clock reaches time=0, this bidder will win the auction item and pay the currently showing auction price.

Figure 7:
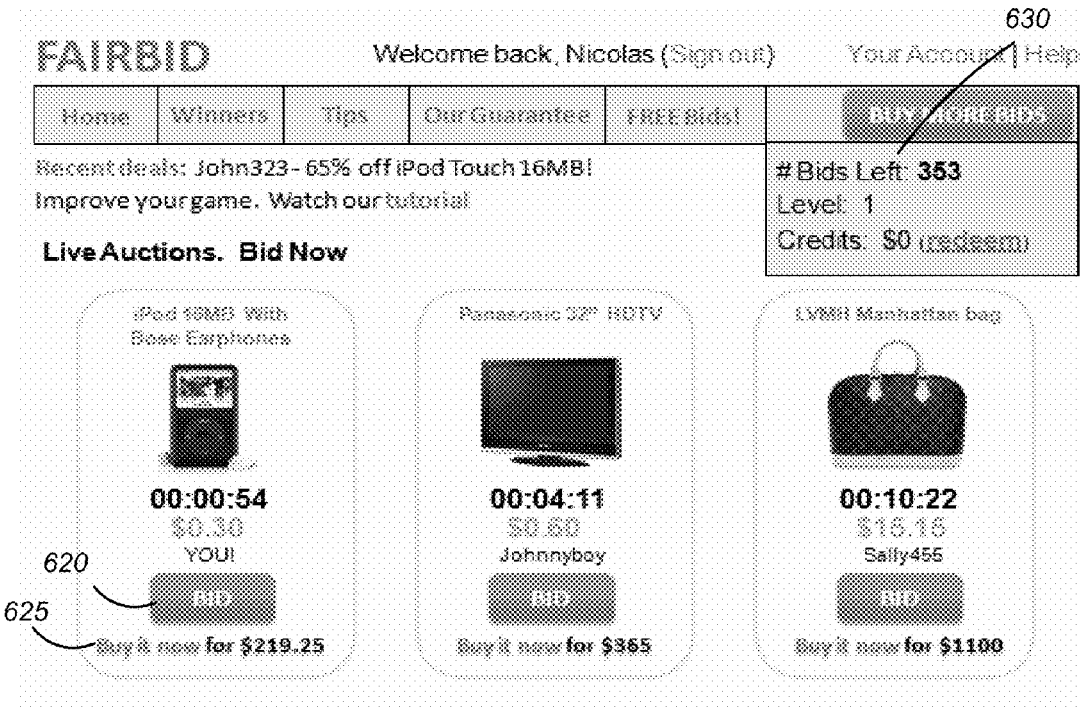
FIG. 7 illustrates one embodiment of a user interface corresponding to a bid placed by a bidder in a guaranteed auction and a reduced retail price of the item for the bidder.

FIG. 7 illustrates one embodiment of a user interface corresponding to a bid placed by a bidder in a guaranteed auction and a reduced retail price of the item for the bidder. Note that in the configuration as disclosed, the bidder does not have to win the auction to acquire the item. As shown in FIG. 6 and FIG. 7, below each auction there is a "BUY IT NOW" selectable interface 625, e.g., a selectable icon or software button, that allows the bidder, whether or not that bidder has placed a bid, to buy the auction item at the current price associated with the BUY IT NOW interface 625. The BUY IT NOW 625 price comprises the retail price of the item minus the value of all the accumulated bids from the user.

For example, in the auction example described, a bidder places their first bid on the auction for the IPOD media player by selecting the BID selectable interface 620, e.g., icon or software button. This selection sends a signal from the browser of the bidder computer system through the network 126 to the auction system computer system 100. The auction system matches the bid and other information received from the bidder computer system with the user (bidder) account. The auction system updates the appropriate database entries for the auctioned item and user account. The auction system also provides for display updated information on the auction for the bidder computer system. Specifically, the price of the iPod goes up by $0.15, the auction clock goes up by 20 seconds, the user's number of BIDS LEFT 630 is now 353 (from a previous value of 354 shown in FIG. 6). In addition, the BUY IT NOW selectable interface 625 shows that the price to currently purchase the item being auctioned is $219.25 for the particular bidder. The site also shows that the user is currently the winner of the auction. Other participants in the auction of this item are provided for display the updated auction price and current bid leader (the bidder user identification would be shown in this example to those users rather than "YOU"). However, the other participants will be shown information on BUY IT NOW price or BIDS LEFT corresponding to their own accounts.

As for the updated retail price for the bidder, the reduced value is determined as follows. If the bidder has bid 30 times on an iPod auction (retail price=$220), the BUY IT NOW selectable interface will be priced at: $220−(30×$0.75)=$197.50. This means that the user can always buy the item at no more than its retail price. In one embodiment, the BUY IT NOW selectable interface 625, and corresponding option to purchase, may be available for a predetermined period of time after the auction is completed, e.g., 24 hours.

Figure 8:
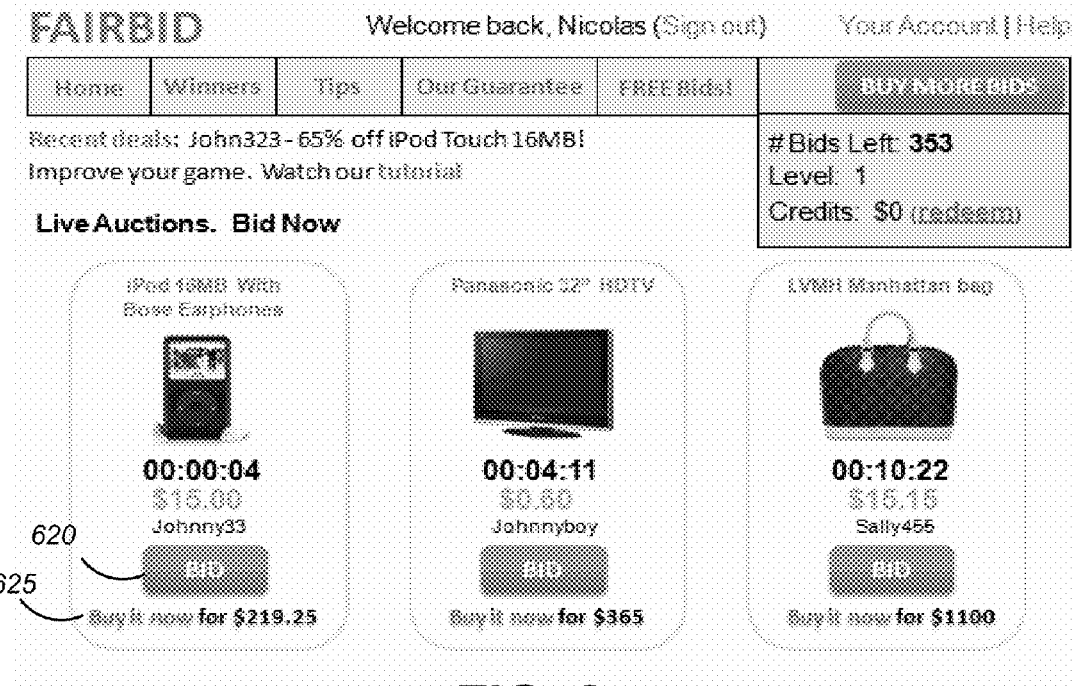
FIG. 8 illustrates one embodiment of a user interface corresponding to bid placed by a third-party bidder for the item in a guaranteed auction in which a user placed a bid.
Figure 9:
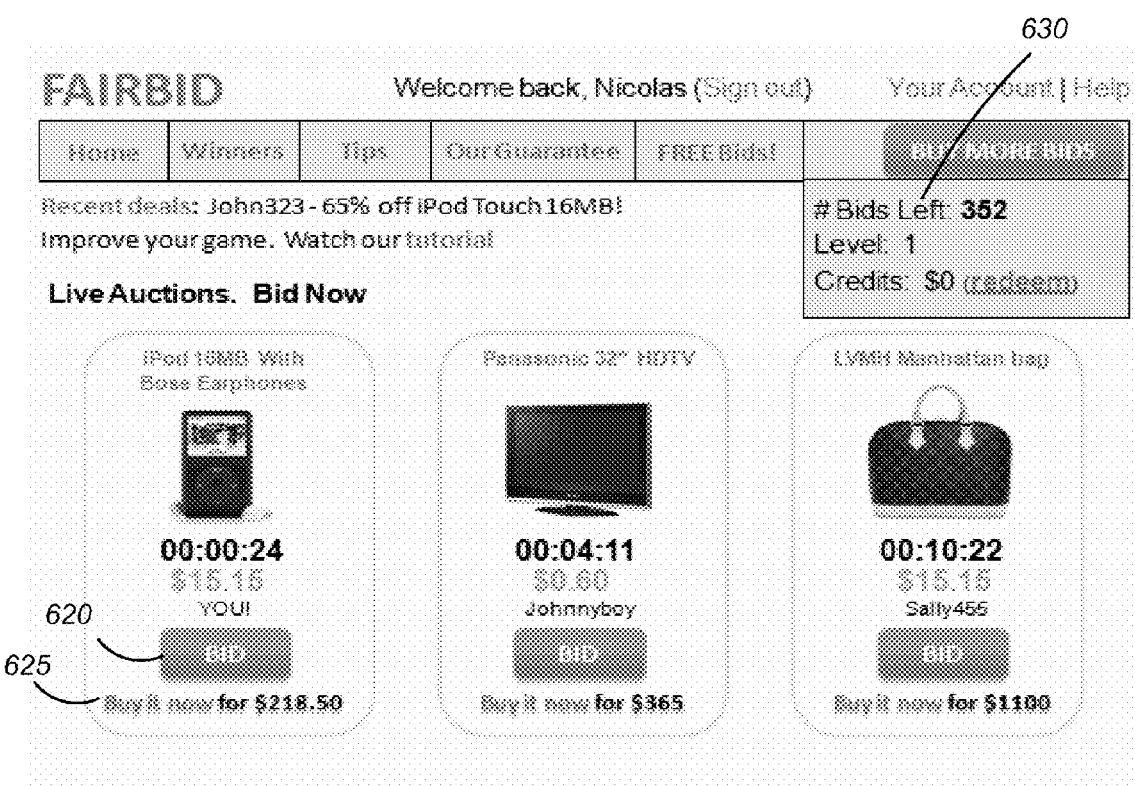
FIG. 9 illustrates one embodiment of a user interface corresponding to a second bid placed by the bidder in a guaranteed auction and a reduced retail price of the item for the bidder.

FIG. 8 illustrates one embodiment of a user interface corresponding to bid placed by a third-party bidder for the item in a guaranteed auction in which a user placed a bid. At this point in the example, the bidder has now waited to see if anyone else bids or if they win. In this case, other participants have bid on the auction item. The bidder watches the auction for a few minutes and the bidding continues. At this point, the price of the iPod has reached $15.00. In this example, the bidder is now ready to bid again and pushes the BID button for the $2^{nd}$ time. When the bid is place the BIDS LEFT 630 information as provided for display has been decreased by 1, the clock increased by 20 seconds, the price increased by $0.15 and the BUY IT NOW selectable interface allows for purchase at a price decreased by $0.75, all of which are reflected from the updated data in the database of the auction system in the computer system 100. An example user interface provided for display on a screen of a bidder computer system reflects this information as illustrated in FIG. 9.

As previously described, it is noted that anytime during the auction, the bidder have three option available with respect to participation. First, the bidder may at any time stop bidding on the auction item and not invest any more money in the auction. The user can watch the auction or simply "walk" away. Second, the bidder can continue to bid and try to win the auction item by selecting the BID selectable interface 620 at any time prior to the expiration of the countdown timer. Finally, the bidder can select the BUY IT NOW selectable interface 625 and purchases the item at the BUY IT NOW price corresponding to the particular bidder. Hence, the bidder has an option to emerge from the auction with the auction item provided the product is available in stock and the bidder has not walked away from the auction. Moreover, in selecting the last option the bidder also is beneficially credited an amount corresponding to the bid investments made in trying to win the auction item, thereby potentially not losing any money in the process of trying to acquire the auction item.

Additional Configuration Considerations

Throughout this specification, plural instances may implement components, operations, or structures described as a single instance. Although individual operations of one or more processes are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. For example, FIGS. 2-4 describe processes that may be implemented as functional components or modules. Likes FIGS. 5-9 describe processes that also may be implemented as functional components or modules. As noted previously, the modules may constitute either software modules (e.g., code embodied on a machine-readable medium or in a transmission signal). However, in alternate embodiments they may comprise hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, the processes describe previously relating to storage of values corresponding to auction amount, bid numbers, offset, and current retail price (retail price minus total of offsets). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a system and a process for tracking bid values to offset a cost of an item available for purchase during an in-process auction through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for purchasing an item available in an auction, the method comprising:
    transmitting to a bidder a plurality of bids for use in an auction, each bid having a predetermined bid value;
    providing for display an item available for auction and a retail price for the item;
    providing for display a selectable interface to place a bid on the item and a selectable interface to purchase the item, the purchase price at the retail price;
    receiving from the bidder at least one bid on the item;
    reducing, in response to each bid received from the bidder for the item, the retail price for the item by a value corresponding to the bid value; and
    providing for display the selectable interface to purchase the item, the purchase price at the reduced retail price in response to each bid received from the bidder for the item.

2. The method of claim 1, wherein the purchase price at the reduced retail price is available to the bidder for a predetermined time period after the auction closes.

3. The method of claim 1, wherein the purchase price at the reduced retail price is available to the bidder during the auction.

4. The method of claim 1, wherein the selectable interface to place the bid comprises one of a hypertext link and an icon.

5. The method of claim 1, wherein the selectable interface to purchase the item comprises one of a hypertext link and an icon.

6. The method of claim 1, wherein the plurality of bids are stored in a database with a user account corresponding to the bidder, the plurality of bids having been acquired in advance of receiving the bid from the bidder.

7. The method of claim 1, further comprising receiving log in credentials from the bidder.

8. A computer readable storage medium storing instructions executable by one or more processors, the instructions when executed cause the one or more processors to:
    transmit to a bidder a plurality of bids for use in an auction, each bid having a predetermined bid value;
    provide for display an item available for auction and a retail price for the item;
    provide for display a selectable interface to place a bid on the item and a selectable interface to purchase the item, the purchase price at the retail price;
    receive from the bidder at least one bid on the item;
    reduce, in response to each bid received from the bidder for the item, the retail price for the item by a value corresponding to the bid value; and
    provide for display the selectable interface to purchase the item, the purchase price at the reduced retail price in response to each bid received from the bidder for the item.

9. The computer readable storage medium of claim 8, wherein the purchase price at the reduced retail price is available to the bidder for a predetermined time period after the auction closes.

10. The computer readable storage medium of claim 8, wherein the purchase price at the reduced retail price is available to the bidder during the auction.

11. The computer readable storage medium of claim 8, wherein the selectable interface to place the bid comprises one of a hypertext link and an icon.

12. The computer readable storage medium of claim 8, wherein the selectable interface to purchase the item comprises one of a hypertext link and an icon.

13. The computer readable storage medium of claim 8, wherein the plurality of bids are stored in a database with a user account corresponding to the bidder, the plurality of bids having been acquired in advance of receiving the bid from the bidder.

14. The computer readable storage medium of claim 8, further comprising instructions that cause the one or more processors to receive log in credentials from the bidder.

15. A method for purchasing an item available in an auction, the method comprising:
    receiving a plurality of bids for use in an auction, each bid having a predetermined bid value;
    providing for display an item available for auction and a retail price for the item;
    providing for display a selectable interface to place a bid on the item and a selectable interface to purchase the item, the purchase price at the retail price;
    transmitting at least one bid on the item;
    providing for display, in response to each bid transmitted for the item, a reduced retail price for the item, the reduced retail price equal to a value corresponding to the bid value; and
    providing for display to each bidder the selectable interface to purchase the item, the purchase price at a new reduced retail price in response to their bids for the item.

16. The method of claim 15, wherein the purchase price at the reduced retail price is available for a predetermined time period after the auction closes.

17. The method of claim 15, wherein the purchase price at the reduced retail price is available during the auction.

18. The method of claim 15, wherein the selectable interface to place the bid comprises one of a hypertext link and an icon.

19. The method of claim 15, wherein the plurality of bids are transmitted to a server database having a user account corresponding to the bidder, the plurality of bids having been acquired in advance of receiving the bid from the bidder.

20. The method of claim 15, further comprising transmitting log in credentials.

* * * * *